US011568482B1

(12) United States Patent
Goel et al.

(10) Patent No.: US 11,568,482 B1
(45) Date of Patent: Jan. 31, 2023

(54) SYSTEMS AND METHODS FOR DETECTING AND LINKING DATA OBJECTS ACROSS DISTRIBUTED PLATFORMS

(71) Applicant: Federal Home Loan Mortgage Corporation (Freddie Mac), McLean, VA (US)

(72) Inventors: Ankit Goel, Oakton, VA (US); Annette Best, Ashburn, VA (US); Domenico Cacciavillani, River Vale, NJ (US); Deanna Jo Dabney, Stafford, VA (US); Deepthi Ganta, Broadlands, VA (US); Matthew Brian Maycott, Broadlands, VA (US); Keenan Moukarzel, Falls Church, VA (US); Samuel Edward Oliver, III, Aldie, VA (US); Thomas C. Schweikert, Leesburg, VA (US); Sukhdeep Kaur Sherry, Ashburn, VA (US)

(73) Assignee: Federal Home Loan Mortgage Corporation (Freddie Mac), McLean, VA (US)

(*) Notice: Subject to any disclaimer, the term of this patent is extended or adjusted under 35 U.S.C. 154(b) by 180 days.

(21) Appl. No.: 16/942,326

(22) Filed: Jul. 29, 2020

(51) Int. Cl.
*G06Q 40/00* (2012.01)
*G06Q 40/02* (2012.01)
(Continued)

(52) U.S. Cl.
CPC ......... *G06Q 40/025* (2013.01); *G06F 16/148* (2019.01); *G06F 16/176* (2019.01); *G06F 16/2365* (2019.01); *G06N 20/00* (2019.01)

(58) Field of Classification Search
CPC .... G06Q 40/00; G06Q 40/025; G06F 16/148; G06N 20/00; G06N 16/176; G06N 16/2365
See application file for complete search history.

(56) References Cited

U.S. PATENT DOCUMENTS 6,249,775 B1 * 6/2001 Freeman ................ G06Q 40/04
705/40
RE47,762 E * 12/2019 Thomas ............... G06Q 50/167
(Continued)

FOREIGN PATENT DOCUMENTS

AU          2010100609 A4 *  8/2010  ............. G06Q 40/02

OTHER PUBLICATIONS

Does borrowing from banks cost more than borrowing from the market? M Schwert—The Journal of Finance, 2020—Wiley Online Library (Year: 2020).*

*Primary Examiner* — Lalita M Hamilton
(74) *Attorney, Agent, or Firm* — Gardella Grace P.A.

(57) ABSTRACT

In an illustrative embodiment, an automated system links data files associated with loan submissions that have different identification attributes. The system may include computing systems and devices for receiving requests from a number of remote computing systems to identify loan products associated with a data file. The system can generate a matching input matrix comparing identification attributes from a first data file to identification attributes of candidate data files. The system can apply attribute matching rules to the matching input matrix to identify other data files that correspond to the same loan product as the first data file despite the data files having different identification attributes. The system can link data files corresponding to the same loan product within a data repository with a product linking key and output the linking key or other data for the loan product to a receiving computing system.

19 Claims, 12 Drawing Sheets

(51) Int. Cl.
  *G06F 16/23* (2019.01)
  *G06N 20/00* (2019.01)
  *G06F 16/14* (2019.01)
  *G06F 16/176* (2019.01)

(56) References Cited

U.S. PATENT DOCUMENTS

| | | | |
|---|---|---|---|
| 10,586,279 B1* | 3/2020 | Ramos | G06Q 90/00 |
| 11,244,387 B1* | 2/2022 | Tarmann | G06Q 30/0278 |
| 2018/0018610 A1* | 1/2018 | Del Balso | G06N 3/08 |
| 2019/0043070 A1* | 2/2019 | Merrill | G06N 5/003 |
| 2020/0265512 A1* | 8/2020 | James | G06N 20/20 |
| 2021/0173854 A1* | 6/2021 | Wilshinsky | G06Q 40/025 |
| 2022/0027345 A1* | 1/2022 | Wu | G06F 40/174 |

* cited by examiner

| 304a | 306a | 308a | 310a | 312a | 314a | 316a | 318a | 320a | 322a | 324a |
|---|---|---|---|---|---|---|---|---|---|---|
| SRC | AppraisalId | LP Key | MERSMIN | LOANID | PARTYID | ADDRESS | CITY | STATE | ZIP | SLID |
| LCA | 110114HGDG | | | 8970300101 | 164997 | 2007 E 56TH AVE | SPOKANE | WA | 99223 | SLID1 |

300

| 304b | 306b | 308b | 310b | 312b | 314b | 316b | 318b | 320b | 322b | 324b |
|---|---|---|---|---|---|---|---|---|---|---|
| SRC | AppraisalId | LP Key | MERSMIN | LOANID | PARTYID | ADDRESS | CITY | STATE | ZIP | SLID |
| LPA | | A1440916 | | 8970300101 | 164997 | 2007 E 56TH AVE | SPOKANE | WA | 99223 | SLID1 |

| Source | Table | Appraisal ID | AUS ID | ID_LOAN_UW_CASE_COMP | MERS MIN | Loan ID | Party ID | Address Line | City | State | Zip | SSN | MATCH_TYPE |
|---|---|---|---|---|---|---|---|---|---|---|---|---|---|
| LSA | LQA | MATCH | MATCH | MATCH | MATCH | MATCH | MATCH | MATCH | MATCH | MATCH | MATCH | MATCH | Y |
| LSA | LQA | MATCH | * | * | * | * | * | MATCH | MATCH | MATCH | MATCH | MATCH | Y |
| LSA | LQA | * | MATCH | MATCH | * | * | * | MATCH | MATCH | MATCH | MATCH | MATCH | Y |
| LSA | LQA | * | * | * | MATCH | MATCH | MATCH | MATCH | MATCH | MATCH | MATCH | MATCH | Y |
| LSA | LQA | MATCH | * | MATCH | * | * | * | SIMILAR | MATCH | MATCH | MATCH | MATCH | Y |
| LSA | LQA | * | MATCH | * | MATCH | * | * | SIMILAR | MATCH | MATCH | MATCH | MATCH | Y |
| LSA | LQA | * | * | * | * | MATCH | MATCH | SIMILAR | MATCH | MATCH | MATCH | MATCH | Y |
| LSA | LQA | * | * | * | * | MATCH | MISMATCH | SIMILAR | MATCH | MATCH | MATCH | MATCH | N |

FIG. 5

| | Source | Target | Appraisal Id | AUS Id | ID_LOAN_UW_CASE_COMP | MBRSMN | Loan Id | Party Id | Address Line | City | State | Zip | SSN | MATCH_TYPE |
|---|---|---|---|---|---|---|---|---|---|---|---|---|---|---|
| 602 | Closing | Other | NC | MISMATCH | MISMATCH | MISMATCH | MATCH | MISMATCH | MISMATCH | MISMATCH | MISMATCH | NC | NC | |
| 604 | Closing | LPA | MISMATCH | MATCH | NC | NC | MATCH | MATCH | NC | MATCH | MISMATCH | MISMATCH | NC | |
| 606 | Closing | COPA | MATCH | MATCH | MATCH | MATCH | MISMATCH | MATCH | SIMILAR | NC | MISMATCH | MISMATCH | NC | |
| 608 | Closing | Other | NC | MISMATCH | MATCH | MATCH | NC | MATCH | NC | NC | MISMATCH | MISMATCH | MISMATCH | |
| 610 | Closing | LPA | MISMATCH | MISMATCH | MATCH | MATCH | MISMATCH | MATCH | SIMILAR | MISMATCH | MISMATCH | NC | NC | |
| 612 | Closing | LOAE | NC | NC | MISMATCH | NC | MATCH | NC | MATCH | MISMATCH | MISMATCH | MATCH | MATCH | |
| 614 | Closing | LQA | NC | NC | MISMATCH | MATCH | MISMATCH | MATCH | MATCH | MATCH | NC | NC | MATCH | |
| 616 | Closing | COPA | MATCH | NC | MATCH | MATCH | NC | NC | NC | MISMATCH | MATCH | NC | NC | |
| 618 | Closing | Selling | MATCH | NC | MATCH | MISMATCH | MATCH | MISMATCH | MATCH | MATCH | NC | MISMATCH | MATCH | |
| 620 | Closing | COPA | MATCH | MATCH | NC | NC | MISMATCH | NC | NC | MATCH | MATCH | NC | MATCH | |
| 622 | Closing | Selling | MATCH | NC | NC | NC | MATCH | MISMATCH | MATCH | MATCH | MATCH | NC | MATCH | |
| 624 | Closing | COPA | NC | NC | MATCH | MATCH | MISMATCH | MISMATCH | NC | MATCH | MATCH | MATCH | MATCH | |

FIG. 6

| SRC | AppraisalId | LP Key | MERSMIN | LOANID | PARTYID | ADDRESS | CITY | STATE | ZIP | SLID |
|---|---|---|---|---|---|---|---|---|---|---|
| LCA | 11011793HF | | | | | | | | | SLID1 |
| LPA | | A1440916 | 1002003001 | 4494000085 | 164997 | 501 FOXBORO DR | NORWALK | CT | 06851 | SLID2 |
| LSA | 11011793HF | A1440916 | 1002003001 | 4494000085 | 164997 | 501 FOXBORO DR | NORWALK | CT | 06851 | SLID1 |

FIG. 7

SYSTEMS AND METHODS FOR DETECTING AND LINKING DATA OBJECTS ACROSS DISTRIBUTED PLATFORMS

SUMMARY OF ILLUSTRATIVE EMBODIMENTS

The present inventors have determined a need for accurately and efficiently matching and linking data file submissions having different identification characteristics based on when and how the given data file submissions were generated or submitted over the course of origination and purchasing processes for an underlying loan. In manual, conventional implementations, a system may generate an assigned key for a mortgage and promulgate the assigned key to one or more third party entities for application to any data files associated with the respective mortgage. However, this puts a large burden on third parties (e.g., lenders, appraisers) to manually apply the assigned key to each document associated with a mortgage. These manual techniques also create room for error and duplicate key assignment. In some examples, lenders and government sponsored entities (GSEs) use third-party key generation solutions to generate and apply unique identification keys to each document associated with a respective mortgage. However, these types of solutions are expensive due to the cost of subscriptions by each of the involved parties and still include the same risk of data quality errors. The implementations described herein present computing systems and methods for automatically matching data file submissions associated with the same mortgage that use different identification mechanisms based on detected common attributes of the data files.

In some embodiments, an automated system links data files associated with loan submissions that have different identification attributes. The system may include computing systems and devices for receiving requests from a plurality of remote computing systems to identify loan products associated with a data file. The system can generate a matching input matrix comparing identification attributes from a first data file to identification attributes of candidate data files. The system can apply attribute matching rules to the matching input matrix to identify other data files that correspond to the same loan product as the first data file despite the data files having different identification attributes. The system can link data files corresponding to the same loan product within a data repository with a product linking key and output the linking key or other data for the loan product to a receiving computing system.

The forgoing general description of the illustrative implementations and the following detailed description thereof are merely exemplary aspects of the teachings of this disclosure and are not restrictive.

BRIEF DESCRIPTION OF THE DRAWINGS

The accompanying drawings, which are incorporated in and constitute a part of the specification, illustrate one or more embodiments and, together with the description, explain these embodiments. The accompanying drawings have not necessarily been drawn to scale. Any values and/or dimensions illustrated in the accompanying graphs and figures are for illustration purposes only and may or may not represent actual or preferred values or dimensions. Where applicable, some or all features may not be illustrated to assist in the description of underlying features. In the drawings:

FIG. 3 illustrates tables of loan identification attributes for submission data files provided by customer-facing systems;

FIG. 5 illustrates a set of ground truth rules for matching submission data files to a loan;

FIG. 6 illustrates a set of training data for training machine learning models to detect matches between loan submission data files;

FIG. 7 is a set of loan identification attributes for submission data files provided to a submission linking system;

DETAILED DESCRIPTION OF ILLUSTRATIVE EMBODIMENTS

Figure 1:
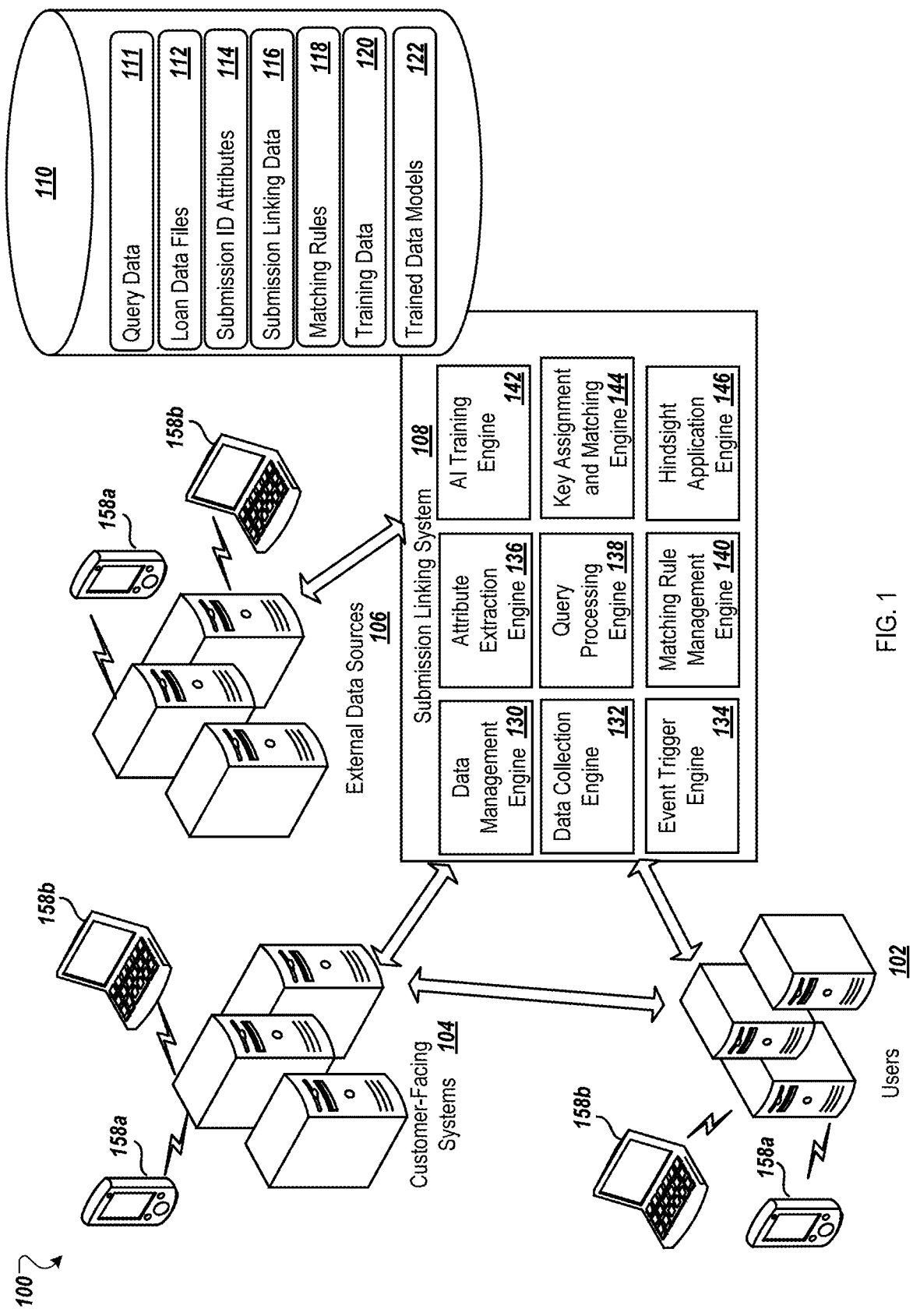
FIG. 1 is an example computing system including software engines in a system for linking submission data files.

The description set forth below in connection with the appended drawings is intended to be a description of various, illustrative embodiments of the disclosed subject matter. Specific features and functionalities are described in connection with each illustrative embodiment; however, it will be apparent to those skilled in the art that the disclosed embodiments may be practiced without each of those specific features and functionalities.

References throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments. Further, it is intended that embodiments of the disclosed subject matter cover modifications and variations thereof.

It must be noted that, as used in the specification and the appended claims, the singular forms "a," "an," and "the" include plural referents unless the context expressly dictates otherwise. That is, unless expressly specified otherwise, as used herein the words "a," "an," "the," and the like carry the meaning of "one or more." Additionally, it is to be understood that terms such as "left," "right," "top," "bottom," "front," "rear," "side," "height," "length," "width," "upper," "lower," "interior," "exterior," "inner," "outer," and the like that may be used herein merely describe points of reference and do not necessarily limit embodiments of the present disclosure to any particular orientation or configuration. Furthermore, terms such as "first," "second," "third," etc., merely identify one of a number of portions, components, steps, operations, functions, and/or points of reference as disclosed herein, and likewise do not necessarily limit embodiments of the present disclosure to any particular configuration or orientation.

Furthermore, the terms "approximately," "about," "proximate," "minor variation," and similar terms generally refer to ranges that include the identified value within a margin of 20%, 10% or preferably 5% in certain embodiments, and any values therebetween.

All of the functionalities described in connection with one embodiment are intended to be applicable to the additional embodiments described below except where expressly stated or where the feature or function is incompatible with the additional embodiments. For example, where a given feature or function is expressly described in connection with one embodiment but not expressly mentioned in connection with an alternative embodiment, it should be understood that the inventors intend that that feature or function may be deployed, utilized or implemented in connection with the alternative embodiment unless the feature or function is incompatible with the alternative embodiment.

Aspects of the present disclosure are directed to systems and methods of detecting commonalities between data file submissions associated with an underlying loan (e.g., mortgage) and assigning digital smart keys to detected data files associated with the same mortgage to provide for more efficient processing of mortgage transactions (e.g., mortgage purchases by a GSE). In some implementations, the data files sharing the commonalities are associated with the loan but may have different identification numbers based on when over the course of origination and purchasing processes for an underlying loan each respective data file was generated or the type of system generating or processing the data file. For example, government sponsored entities (GSEs) may interact with various parties (e.g., mortgage lenders, appraisers) responsible for generating or maintaining information associated with a mortgage or mortgaged property. In some examples, a GSE can offer a suite of products, tools, and applications with interfaces for such parties to provide information and/or documents regarding the mortgaged properties at various times in the course of mortgage origination and purchase. For example, the product suite may include an automated mortgage processing application, loan closing application, and loan purchase application. Because each document processed by a respective application may identify a given mortgage or mortgaged property with different identification information (e.g., property address, one or more keys, borrower identification information), inefficiencies are created when it comes to matching documents and information for the same mortgage that have been processed by different applications over time. For example, when each entity associated with a mortgage transaction generates a document or piece of data, the respective entity may have its own scheme for assigning identification keys to mortgages which may not correspond to other entities interacting with the various tools of the mortgage processing suite. Therefore, determining which data file corresponds to another data file associated with the same loan but processed by a different mortgage processing tool can become a laborious, cumbersome task that is subject to numerous inefficiencies.

In some embodiments, the systems and methods described further herein are directed to solving these problems and inefficiencies by detecting common features shared between various data files in order to identify which data files are associated with the same mortgage and assigning a unique digital smart key to each data file associated with the same mortgage. In some examples, to detect data files that correspond to the same loan, the system applies a predetermined set of rules to local data file identifiers to match each of the data files to a given loan. In some embodiments, the rules may be generated using a machine learning algorithm trained to identify correlations between data file identifiers based on characteristics of the software tools that received and processed each of the respective data files. In one example, the system applies a set of user-defined rules to trained machine learning algorithms to generate millions of additional rules, further improving the accuracy of automated match detections. In this way, the system can apply a relatively small training data set to the machine learning algorithm (a few thousand records) to greatly increase the number of rules for matching data files. Additionally, the system produces the machine-learning-generated rules in a matrix-based, consumable format that allows users to review why the system defines certain combinations as a matching result and others as a non-matching result. The matrix-based format also allows system administrators to modify and/or simplify one or more aspects of the rules to better achieve predefined goals while maintaining overall system accuracy.

Additionally, rather than use a black-box implementation of the machine learning algorithm, in some implementations, the system outputs the generated set of matching rules. This allows system users to review the specific correlations corresponding to match versus non-match results and allows the users to make manual adjustments to the rules as desired and allows the users to understand why the system detects certain match versus non-match conditions. In some examples, the machine learning algorithm can be retrained based on the manual updates to the matching rules. Consequently, the systems and methods described herein provide a technical solution to the technical problem of automatically matching data files based on detected correlations between the files that have been processed by independent platforms. This technical solution is completely transparent to system users and can detect the data file correlations independent of when during origination and purchase of a mortgage each of the data files was generated and/or processed.

FIG. 1 is a diagram of an example environment 100 for a submission linking system 108 based on detected correlations between data files generated and processed during origination and purchase of a mortgage loan. The diagram illustrates a series of interactions between one or more participants and devices in the submission linking system 108, which is configured to match data files associated with the same loan based on certain detected commonalities between identification attributes for the data files. In some implementations, portions of the data files are generated and/or processed by different customer facing systems 104 at different times during origination and/or purchase processes for a loan. Being able to detect correlations and match data files associated with a particular loan allows entities like government sponsored entities (GSEs) deciding whether or not to purchase a given mortgage from a lender to have all relevant data files associated with the mortgage linked and stored in one place.

Additionally, automating the process of assigning a smart key, referred to herein as a submission link ID (SLID), associated with a given mortgage to different data files with different identification schemes and codes removes human error from manual implementations where human administrators manually process mortgage data files to match documents and assign keys. In some cases, these errors can occur due to misassignment of a key to the wrong mortgage, missed correlations between data files for the same mortgage, or assignment of a non-unique key to data files for a mortgage. Throughout the disclosure, the submission linking system 108 is described with respect to data files for mortgage loans but can also be used in other applications in which data files associated with a single entity are processed or generated by multiple, distributed systems (e.g., credit card records, other types of loans). The automated matching techniques and rules applied by the submission linking system allow different or distributed customer-facing systems to prioritize their own loan identification schemes without having to rely on positive matches between all identification attributes associated with a particular loan.

Users 102, in some implementations, include computing devices and databases distributed across a widely dispersed network that may be distributed across a large, international geographic area. The user network, in some implementations, can be separate and independent from any network associated with any other participant or entity in the smart key assignment environment 100, such as external data sources 106 or customer-facing systems 104. In some implementations, the users 102 can include anyone who initiates a request with the system 108 at a remote computing device 158, such as mobile device 158a, computer 158b, or any other type of remote computing device. In one example, users 102 submit requests at one or more user interface screens provided by the submission linking system 108 through a web or application interface. For example, the users 102 can include employees or members of a loan purchasing entity (e.g., GSE). In some examples, loan purchasing entities can offer lenders representation and warranty relief, which is a guarantee that the loan purchasing entity will not require the lender to repurchase the loan from the loan purchasing entity in case certain flaws in the loan origination and documentation process are found at a later date. To provide this relief, the loan purchasing entity can require that the mortgage being purchased meet predetermined criteria. The submission linking system 108 can provide loan purchasing entities the assurance that the lenders it offers representation and warranty relief to are making loans that meet all of the predetermined criteria by automatically detecting commonalities between mortgage documents that use different loan identification keys and properties and automatically linking those data files that it determines are associated with the same mortgage.

The users 102, in some embodiments, can also include customers who also interact with one or more of the customer-facing systems 104. For example, mortgage lenders, appraisers, or home purchasers may have an interest in accessing and/or viewing all data files associated with a given mortgage whether or not a respective data file was processed by the respective customer-facing system 104 with which the user 102 interacted. In some examples, users 102 can submit requests to the submission linking system 108 for one or more data files matched to a respective mortgage loan via one or more of the customer-facing systems 104. For example, a mortgage lender may interact with a loan closing advisor system, and the loan closing advisor system may submit a request to the system 108 for one or more data files generated by an automated loan underwriting system that are associated with the same loan.

Customer-facing systems 104, in some embodiments, include computing devices and databases distributed across a widely dispersed network that may be distributed across a large, international geographic area. In some implementations, the customer-facing systems 104 can include computing systems that each provide a particular set of loan management tools to customers based on where a loan is in an origination and purchase process. The customer-facing system network can be separate and independent from any network associated with any other participant in the environment 100, such as the external data sources 106 or users 102. In some examples, each of the customer-facing system 104 may be independent from other customer-facing systems interacting with the system 108. As discussed above, users 102 can submit queries to the system 108 via the customer-facing system 104. Additionally, the customer-facing systems 104 may also submit queries to the system 108 for one or more data files associated with a particular mortgage loan.

Figure 2:
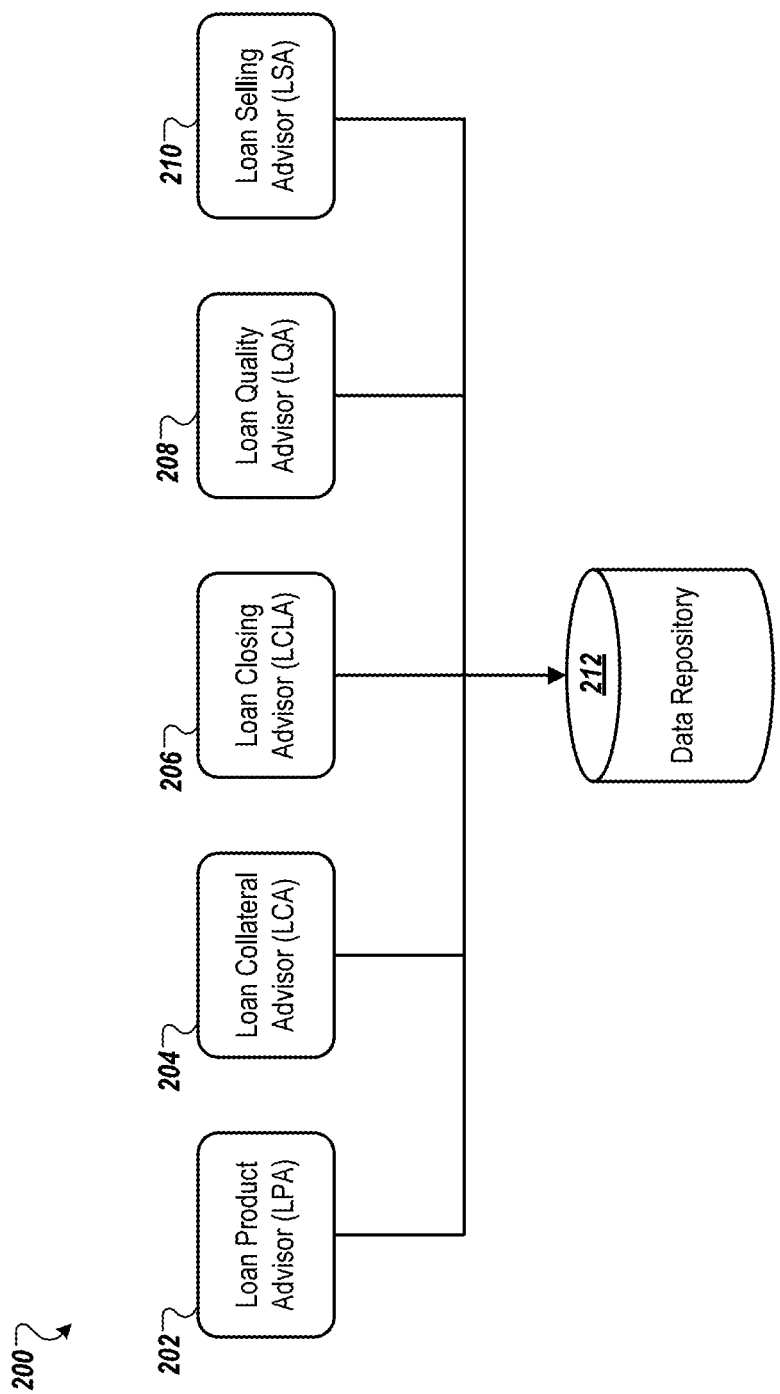
FIG. 2 is a diagram of customer-facing systems that interface with a digital submission linking system.

For example, FIG. 2 is a diagram of a loan advisor suite 200 that includes customer-facing systems 202-210 that interact with a data repository 212 for a submission linking system. In one example, the customer-facing systems 202-210 may correspond to customer facing systems 104, and data repository 212 may correspond to data repository 110 (FIG. 1). While FIG. 2 shows that the loan advisor suite 200 includes five customer-facing systems 202-210, it can be understood that in other implementations, there may be larger or smaller numbers of customer-facing systems in the loan advisor suite 200.

In some embodiments, each of the customer-facing systems 202-210 generates and/or processes data files associated with a mortgage loan at particular time in its origination and purchase phases, and each of these data files may have one or more loan identification features that vary based on the type of information provided in the data file. Further, each customer-facing system 202-210 may prioritize certain identification characteristics of data files more than others based on the purpose of the respective customer-facing system or characteristics of the data files generated by that system. For example, one type of customer-facing system is a loan product advisor (LPA) 202 that automates the loan underwriting process and includes an eligibility check for representation and warranty relief based on an assessed underwriting risk for the loan. A loan collateral advisor (LCA) 204, in some implementations, is a tool that analyzes submitted appraisals for properties associated with a mortgage application and provides appraisal valuation risk. In some examples, a loan closing advisor (LCLA) 206 system generates a uniform closing data set (UCD) and provides feedback to customers feedback on the UCD data file to reduce the likelihood of loan remediation. A loan quality advisor (LQA) 208 system, in some examples, provides customers a loan risk assessment from the perspective of the loan purchasing entity, which can include an eligibility assessment for representation and warranty relief for the mortgage. Additionally, the loan advisor suite 200 can also include a loan selling advisor (LSA) 210 system that confirms loan purchase eligibility and representation and warranty relief eligibility for the property. In some examples, the loan advisor suite 200 can include extensions of customer-facing systems 202-210 as well as other associated customer-facing systems. In one example, the LCA 204 can include a loan collateral advisor extension (LCAE). The loan advisor suite 200 can also include a condo project advisor (COPA) that controls and streamlines condominium project underwriting.

Customers (e.g., mortgage lenders), in some implementations, interact with one or more user interface screens provided by a respective customer-facing system 202-210 to provide information and/or documentation associated with the purpose of the respective system. When handling and/or processing information, each of the systems 202-210 use certain attributes for loan identification. Some of these identification attributes may overlap with identification attributes of other customer-facing systems 202-210 while other identification attributes may be used by just one or a few of the customer-facing systems 202-210.

For example, FIG. 3 illustrates sets of loan identification attributes 300, 302, each associated with a different customer-facing system 202-210. Table 300 shows loan identification attributes associated with LCA system 304a, and table 302 shows loan identification attributes for associated with LPA system 304b. In some embodiments, the loan identification attributes can include an appraisal identification (ID) 306, Automated Underwriting (AUS) Key 308 such as a loan product (LP) key or a Desktop Underwriter (DU) key, MERS MIN loan identifier 310, lender loan ID 312, party (e.g., borrower) ID 314, address 316, city 318, state 320, and zip code 322. Other loan identification attributes can include borrower social security number (SSN). In some implementations, the types of loan identification attributes used by a particular customer-facing system can be based on which stage in a loan origination and servicing process that customers use each of the systems in the loan advisor suite 200 as well as types of data used by the particular system. In some examples, the LCA system 304a may prioritize the Appraisal ID 306a in identifying while the LPA system 304b may prioritize the AUS (LP) key 308 in identifying loans. Additionally, the MERS MIN identifier 310 may not be available at the LPA 304a (202 in FIG. 2) but may instead be used to match loans between the closing and selling stages.

Moreover, lenders are not required to interact with systems of the loan advisor suite 200 in a particular order, which means that some identifiers will be used before others for different loans based on the order of interaction with each of the customer-facing systems 202-210. Additionally, some identification attributes 304-322 may carry a greater risk for errors and inaccuracies than other identifiers in each system. For example, lenders may use generic values for each of the identification attributes (also referred to as keys), the lenders may reuse the same keys for different loans, or the lenders may enter incorrect values for one or more of the identification attributes. The submission linking system 108, in some embodiments, can reduce the impact of these error risks on the ability for data files associated with the same loan to be linked together. As discussed further below, the system 108 can apply a set of matching rules to the identification attributes for data files generated by different customer-facing systems and link data files where a match is detected. The application of matching rules by the system 108 allows customers to maintain their current loan identification schemes for loan submission data files without having to absorb the burden of manually applying a system-generated ID. Further, the submission linking system 108 enables customers to interact with the customer-facing systems in any order within the origination and purchase phases of a loan.

In the example of FIG. 3, table 300 shows that in some embodiments, data files generated by the LCA system 304a can include identification attributes of appraisal ID 306a, loan ID 312a, party ID 314a, address 316a, city 318a, state 320a, and zip code 322a. In some examples, the attributes provided in the table 300 correspond to attributes of importance to users 102 performing and submitting information for loan collateral assessments (e.g., appraisal ID 306a). In addition, table 302 shows that the LPA system 304b generates data files that can include identification attributes associated with performing automatic underwriting such as AUS (LP) key 308b, loan ID 312b, party ID 314b, address 316b, city 318b, state 320b, and zip code 322b. In some implementations, the submission linking system 108 can apply sets of match detection rules to the loan identification attributes 300, 302 to determine that the attributes 300, 302 are associated with the same loan. Upon detecting a match, the system 108 applies a SLID 324a,b, also referred to as a smart key, that is used to track all submission data files associated with the respective loan. In some examples, the SLID 324a,b can be used to link different submission data files to the same loan when certain matching criteria are met. Details regarding determining and applying match detection rules are discussed further below.

Returning to FIG. 1, in some implementations, one or more external data sources 106 may also interface with the submission linking system 108 in the environment 100. External data sources 106 can include computing devices and databases distributed across a widely dispersed network that may be distributed across a large, international geographic area. The external data source networks can be separate and independent from any network associated with any other participant in the smart key assignment environment 100, such as the users 102 or customer-facing systems 104. In addition, the data handled and stored by the external data sources 106 may be in a different format than the data handled and stored by the other participants of in the smart key assignment environment 100. In some implementations, the external data sources 106 may include public and private data sources that provide information pertaining to mortgaged properties. In some examples, the external data sources 106 that provide amplifying information can include websites, servers, and data sources for public property records systems, multiple listing service (MLS) systems, appraisal records, public records, bank records, or other loan records. In some aspects, the external data sources 106 may additionally interface directly with the customer-facing systems 104 to provide information to customers at the loan advisor suite.

The users 102, customer-facing systems 104, external data sources 106, and data repository 110 can connect to the submission linking system 108 through computing devices 158 (e.g., mobile device 158a, computer 158b, or any other type of computing device) via a wired or wireless network (not shown). The network can include one or more networks, such as the Internet and can also communicate via wireless networks such as WI-FI, BLUETOOTH, cellular networks including EDGE, 3G, 4G, and 5G wireless cellular systems, or any other wireless form of communication that is known.

The submission linking system 108 includes one or more engines or modules that perform processes associated with processing queries for information and data files associated with loans, training a machine learning algorithm to determining rules for matching loan submission data files, and applying matching rules to identification attributes for one or more submission data files to identify data file matches that correspond to the same loan. References to the engines or modules throughout the disclosure are meant to refer to software processes executed by circuitry of one or more processing circuits, which can also be referred to interchangeably as processing circuitry. In some implementations, the processes associated with the submission linking system 108 can be performed by one or more servers having one or more processing circuits such that some processes or portions of processes may be performed on different servers.

In one example, the submission linking system 108 includes a data management engine 130 that organizes the data received by the submission linking system 108 from the users 102, customer-facing systems 104, and external data sources 106 and controls data handling during execution of the processes described further herein. In some implementations, the data management engine 130 processes loan submission data files from each of the customer-facing systems 104 that have received by data collection engine 132 and loads the received data to data repository 110 as loan data files 112. In some examples, the data management engine 130 can also link loan data files 112, submission ID attributes 114, and submission linking data 116 for matched loans within the data repository 110.

The data management engine 130, in some embodiments, also controls the interaction of the submission linking system 108 with at least one data repository 110 associated with the environment 100. For example, the data management engine 130 controls the storing and accessing of both system-generated data and system-received data as well as the interactions between system-generated and system-received data. For example, the data management engine 130 accesses training data 120 from data repository and provides the training data 120 to artificial intelligence (AI) training engine 142. Further, the data management engine 130 receives trained data models 122 and matching rules 118 from the AI training engine 142, which it stores in the data repository 110. In some embodiments, the data management engine 130 controls the flow of data between the data repository 110 and the submission linking system 108.

The submission linking system 108, in some implementations, also includes a data collection engine 132 that controls the gathering of data from the users 102, customer-facing systems 104, and external data sources 106 in real-time. In some implementations, the data collection engine 132 receives loan submission data files from each of the customer-facing systems 104, which are stored in data repository as loan data files 112. In some examples where the system 108 supplements mortgage data with information from external data sources 106, the data collection engine 132 can perform one or more web scraping or crawling procedures on websites and databases of one or more external data sources 106 for the respective mortgage-related information.

In some implementations, the submission linking system 108 can also include an event trigger engine 134 that manages the flow of data updates to the submission linking system 108. For example, the event trigger engine 134 may receive new loan submission data files from one or more customer-facing system 104 in the loan advisor suite and trigger the data collection engine 134 to process the newly submitted or updated submission data files. Further, the event trigger engine 134 can trigger attribute extraction engine 136 to being identification attribute extract from each of the received submission data files. Additionally, upon application of loan identification attributes for one or more submission data files in a set of candidate matches to the trained model of matching rules, the event trigger engine 134 notifies a hindsight application engine 146 to perform a retroactive matching process to identify other matching loan submission data files that also correspond to a particular loan.

The submission linking system 108, in some embodiments, can also include an attribute extraction engine 136 that extracts loan identification attributes from each data file submitted by one of the customer-facing system 108. In some examples, the loan identifications include those attributes shown and described above with respect to FIG. 3 (e.g., appraisal ID 306, AUS (LP) key 308, MERS MIN loan identifier 310, lender loan ID 312, party ID 314, address 316, city 318, state 320, and zip code 322). In some examples, the attribute extraction engine extracts the identification features, collects them into feature vectors associated with each of submission data file (e.g., tables 300 and 302 in FIG. 3), and stores the feature vectors as submission ID attributes 114 in data repository 110. In some implementations, the query itself may include the extracted identification attributes, which the attribute extraction engine 136 can arrange into the respective feature vector for the data file.

In some implementations, the submission linking system 108 can also include a query processing engine 138 that receives and processes requests for data file matching from users 102 and/or customer-facing systems 104. In some examples, queries can be initiated and transmitted to the system 108 by customer-facing systems 104 and may be associated with one or more functions of the respective customer-facing system 104. For example, the LPA 202, LCA 204, LCLA 206, LQA 208, and/or LSA 210 systems may initiate requests of the system 108 for matched submission data files submitted to any of the customer-facing system 104 in the loan advisor suite 200. These requests submitted to the system 108 for data file matching can be used to confirm, in real-time and with high accuracy, certain criteria for representation and warranty relief eligibility for a loan and/or meeting certain criteria associated with the UCD mandate. Additionally, in some examples, users 102 can initiate a request with the system 108 at a remote computing device 158, such as mobile device 158a, computer 158b, or any other type of remote computing device. In one example, users 102 submit requests at one or more user interface screens provided by the submission linking system 108 through a web or application interface.

The query processing engine 138 can provide the interface between the customer-facing systems 104 and the submission linking system 108 for query submission and response. For example, the query processing engine 138 can provide received query information to key assignment and matching engine 144 to identify other submission data files that correspond to a loan associated with the query. Additionally, the query processing engine 138 can provide matching results to the requesting customer-facing system 104 and/or user 102. In some implementations, the requesting system may be different from a target system receiving the results of the query, and the query processing engine 138 can arrange the coordination of managing queries that have different source and target systems. In one example, the requesting (source) system may be the LSA system 210, and the target system is LCLA system 206. As discussed further below, in some examples, the source and target systems can have an impact on how the matching rules are applied to the identification attributes for identification attributes of submission data files that are analyzed for matching. Submitted query information including source system, target system, and submission data files included in the query can be stored in data repository 110 as query data 111.

In some examples, the submission linking system 108 includes a matching rule management engine 140 that generates matching rule sets using the trained machine learning model and provides users 102 the ability to review and edit the machine learning-generated rules. In some implementations, users 102 can provide the matching rule management engine 140 with a set of matching rules for determining whether sets of identification attributes for loan submission data files correspond to the same loan. In some examples, the user-provided matching rules can be referred to as "ground truth" rules. For example, one "ground truth" rule can be that a new set of borrower SSNs (one or a combination of SSNs) corresponds to a new loan regardless of whether any of the other identification attributes match.

In some implementations, the matching rule management engine 140 can apply the ground truth rules to trained machine learning models 122, which output additional rules for detecting matches between different sets of identification attributes for loan submission data files. In one example, using a set of manually-defined ground truth rules, the machine learning models can generate over fifteen million additional rules for detecting matches between submission data files for the same loan from approximately one hundred ground truth rules, thereby increasing match detection accuracy from around 80% with the ground truth rules alone to greater than 99% accuracy in successful matches with both the ground truth rules and machine learning-generated rules. In some examples, when the machine learning model is an extreme gradient boosted tree model, the matching rule management engine 140 can convert matching probabilities for each combination of identification attributes into combinations of matching rules that can be used to detect matches between submission data files. Both the ground truth rules and the machine learning-generated rules can be stored in data repository 110 as matching rules 118.

Figure 4:
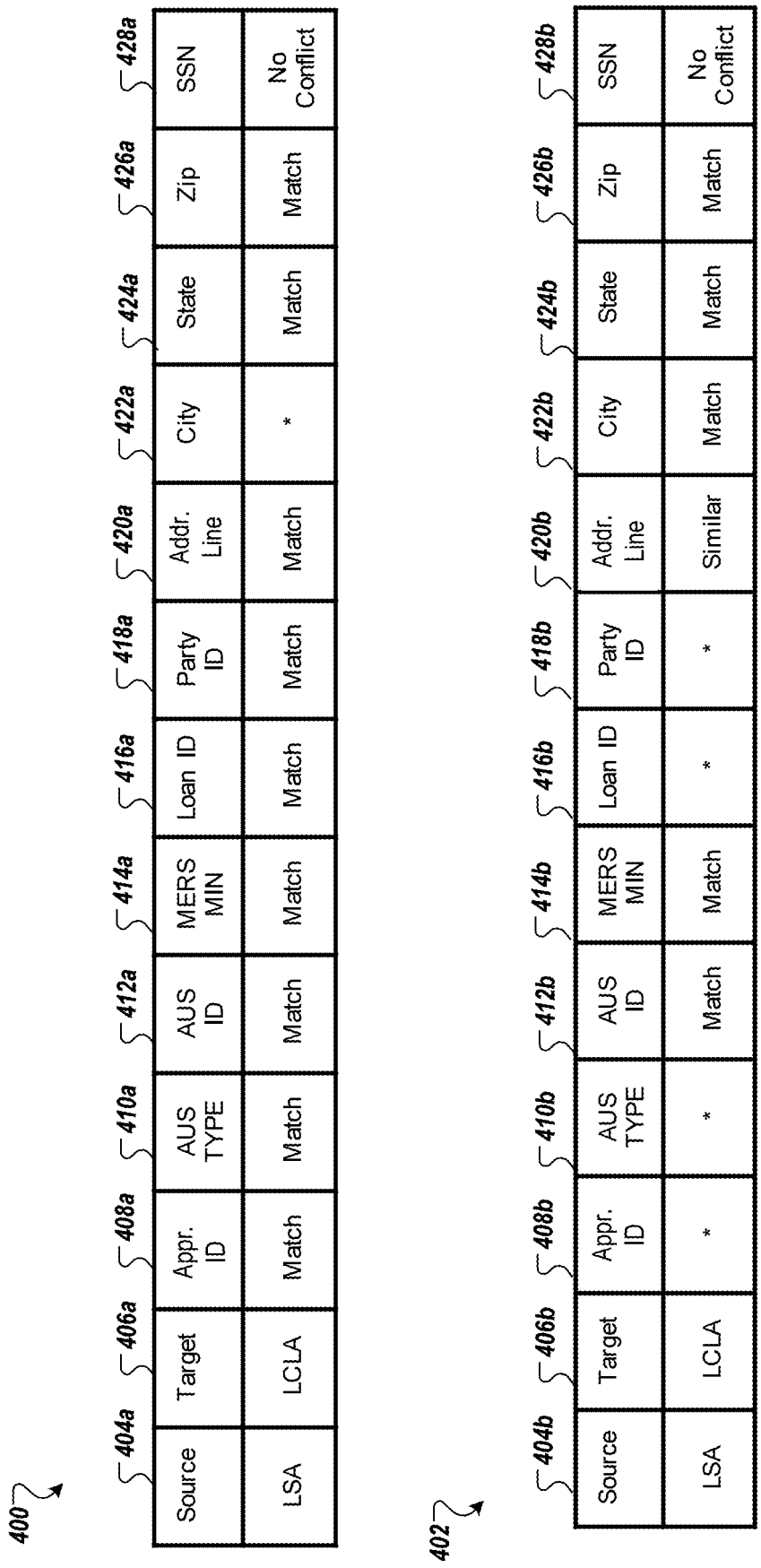
FIG. 4 illustrates sets of rules for matching submission data files to a loan.

FIG. 4 shows sets of rules 400, 402 for matching loan identification attributes across submission data files. The matching rule sets 400, 402 in some examples, define criteria for determining that submission data files correspond to the same loan based on indicated loan identification attributes. In some examples, each of the matching rules 400, 402 include a source system 404a,b and a target system 406a,b. In the example shown in FIG. 4, the source system 404a,b is the LSA system, and the target system 406a,b is the LCLA system. As discussed further below, in some embodiments, the key assignment and matching engine 144 can apply different weighting factors to different submission identification attributes based on a relative importance of each of the identification attributes to the source system and/or the target system.

Although both sets of matching criteria 400, 402 shown in FIG. 4 have the same source system 404a,b and target system 406a,b, the criteria 400, 402 provide different combinations of submission identification attributes that both correspond to a match condition. For example, matching rule 400 represents a match condition between two submission data files when appraisal ID 408a, AUS type 410a, AUS ID 412a, MERS MIN 414a, loan ID 416a, party ID 418a, address line 420a, state 424a, and zip code 426a attributes match and there is no conflict between SSNs 428a. Further, matching rule 400 does not include a matching condition for state 424a. Additionally, matching rule 402 represents a match condition between two submission data files when AUS ID 412b, MERS MIN 414b, city 422b, state 424b, and zip code 426b attributes match, address lines 420b are similar, and there is no conflict between SSNs 428b. In some examples, a determination that two addresses are similar occurs when one address is a subset of the other (e.g., 123 Main Street and 123 Main Street Apartment 131). Further, matching rule 402 does not include matching conditions for appraisal ID 408b, AUS type 410b, loan ID 416b, and party ID 418b. In some implementations, the attributes not included in the matching determination for each of the rules 400, 402 are not factored into the analysis of whether the matching condition is met.

In some implementations, matching rules can also explicitly define non-match conditions. For example, FIG. 5 shows a set of ground truth rules 500 that define both matching 502 and non-matching 504 (also referred to as mismatching) conditions for submission data files for a source system of LSA 506 and a target system of LQA 508. In other examples, the source and target systems can include any of the customer-facing systems 104. For rule 504, a non-match condition results when there is a mismatch between party ID 510 between submission data files even when there is a match between loan ID 509, city 514, state 516, zip code 518, and SSN 520, and the address lines 512 are similar. Where a rule does not include a value ("match," "mismatch," or "similar") for a particular identification attribute, in some examples, that respective identification attribute may not factor into the analysis for the respective rule (e.g., Appraisal ID 501, AUS ID 503, ID LOAN UW CASE COMP 505, MERS MIN 507, loan ID 509 and party ID 510 attributes for rule 522). In some examples, identification attribute ID LOAN UW CASE COMP 505 corresponds to an indication of a comparison between ID LOAN UW CASE values for the submission data files, which can be an alternate indicator for the AUS ID 503.

Returning to FIG. 1, in some implementations, the matching rule management engine 140 can provide users 102 with a mechanism to manually review and edit one or more matching criteria of the machine learning-generated matching rules. One of the advantages of the submission linking system 108 is that the trained machine learning models output matrices of machine learning-generated rules that the system uses to determine whether submission data files correspond to the same loan. This allows customers to determine, in a consumable format, why certain combinations of submission identification attributes are associated with the same loan while others correspond to mismatches. Without this rules-based approach, users 102 would be unaware of why a machine learning model determined that a submission data file was associated with a particular loan. The matching rule management engine 140, in some examples, can provide users 102 with user interface screens at external devices 158 to review and adjust matching rules as desired. In some cases, users 102 may wish to adjust data file matching criteria associated with one or more of the rules based on changes to loan identification attributes associated with data files submissions provided by one of the customer-facing systems 104. When these manual overrides to the rules are made by users 102, in some examples, AI training engine 142 retrains the machine learning models that generate the matching rules.

In some embodiments, the submission linking system 108 can also include an AI training engine 142 that trains one or more machine learning models to determine correlations that correspond to matches between submission data files from customer-facing system 104. In addition to the ground truth rules that are used to train the machine learning models, the AI training engine 142 can also train the machine learning models with a few thousand records of submission identification attributes that are labeled as matches or non-matches. For example, FIG. 6 shows a portion of a randomly generated training data set 600 of submission identification attributes that is used to train machine learning data models 122. In some implementations, for each rule 602-624, one or more users 102 label each attribute combination with a match type 626 as either a "match" or a "non-match." In some implementations, the identification attribute combinations 602-624 along with the respective labels 626, can be used to train the machine learning machine learning models to determine when loan submission data files correspond to the same loan despite having different identifying characteristics. The identification attribute combinations 602-624 and labels 626 can be stored in data repository 110 as training data 120.

Returning to FIG. 1, in some examples, upon being trained, the machine learning models 122 can produce matrices of matching rules 118 (see matching rules 400, 402 in FIG. 4) in addition to models that can be used to detect matches between submission data files. When the machine learning model is a random forest model, the AI training engine 142, in some implementations, generates multiple gradient boosted tree models and averages them together to generate an overall tree model for detecting matches. The AI training engine 142 can perform at least one model optimization round where the models and rules are updated based on an accuracy of matching predictions by the models. The models can be further retrained based on manual updates to the machine learning-generated rules, additions of new source systems, additions to identification attributes, or changes in a data profile of information provided by each of the customer-facing systems 104. In some embodiments, the matrices of matching rules indicating both match and non-match condition criteria reflect the decision criteria in the trained tree models for detecting match conditions between submission data files. Additionally, the machine learning models described herein are not limited to tree models. In other examples, the machine learning models can include any combination of linear regression models, logistic regression models, neural networks, support vector machines, or random forest tree models. In some implementations, the AI training engine 142 can apply the training data to an auto machine learning (ML) service that can rank the models based on predictive capability and identify a highest performing type of machine learning model.

The submission linking system 108, in some implementations, also includes a key assignment and matching engine 144 that detects correlations between identification attributes associated with previously submitted submission data files. In some embodiments, the key assignment and matching engine 144 can, based on the information for a loan included in a query (e.g., a submission data file from one of the customer-facing system 104), identify all candidate SLIDs (stored as submission linking data 116 in data repository 110) associated with submission identification attributes 114 stored in data repository. In one example, candidate SLIDs can include those SLIDs that have any associated identification attribute that matches any of the identification attributes for the loan and/or submission data file associated with the query. In some implementations, the key assignment and matching engine 144 can generate a matrix of all identification attributes associated with candidate SLIDs for applying to the machine learning models.

Additionally, in preparation for applying the identification attributes for the candidate SLIDs to the trained models, the key assignment and matching engine 144 can generate a model input matrix that compares each identification attribute for the candidate SLIDs to the identification attributes for the loan submission data file associated with the respective query and inserts a result for each comparison. In some examples, the comparison result applied to each input matrix field can correspond to a "match," "mismatch," "no conflict," or "similar." In some examples, a value of "no conflict" corresponds to comparison results where the compared attributes do not directly conflict with each other, such as when at least value exists for one attribute but not for the other or neither entry has a value. In some examples, a value of "no conflict" is a neutral result that may not factor into the matching analysis. In some examples, if the model input matrix entries have numerical values, a value of 1 can be applied to a "match" condition, a value of −1 can be applied to a "mismatch" condition, a value of 0 can be applied to a "no conflict" condition, and a value of 0.5 can be applied to a "similar" condition.

In some embodiments, the key assignment and matching engine 144 can apply the model input matrix to the set of matching rules or the trained machine learning model to detect matches between submission data files that correspond to the same loan. In some examples, the key assignment and matching engine 144 can provide the input matrix as an input to the trained machine learning tree models and/or apply the input matrix to the matrix form of the rules to determine whether the identification attributes of the loan submitted with the query correspond to any submission data files previously submitted by one of the customer-facing systems 104. In some examples, once the set of matching rules has been derived by the machine learning model, the key assignment and matching engine 144 uses the matching rules alone to determine whether the submitted identification attributes correspond to any of the loans associated with the candidate SLIDs. The key matching and assignment engine 144, in some implementations, identifies the matching SLID by applying each of the matching rules to each row in the input matrix associated with a candidate submission data file.

In some examples, if a match to one or more data files is detected, the key assignment and matching engine 144 assigns a SLID to the submission data file provided with the query that corresponds to the SLID for the matching data files. If no match is detected to any of the submission ID attributes 114 for loan data files 112 provided to the submission linking system 108, in some implementations, the key assignment and matching engine 144 assigns a new SLID to the loan submission data file submitted with the respective query. In some examples, the key assignment and matching engine 144 stores assigned SLIDs for each submission data file in data repository 110 as submission linking data 116. Additionally, data management engine 130 can link the submission linking data 116 to respective submission identification attributes 114 and loan data files within data repository 110.

In some implementations, the key assignment and matching engine 144 can apply different weighting factors to the identification attributes in the matching process based on a relative importance of each of the identification attributes to the source system and/or the target system in the loan advisor suite 200 (FIG. 2). For example, the LCA system 204 and LQA system 208 may prioritize the Appraisal ID for matching more than other systems. Additionally, the LPA system 202 may prioritize the LP key when matching loan submission data files with the LSA system 210. In other examples, the key assignment and matching engine 144 can apply equal weights to each of the loan identification attributes associated with the matching analysis.

The match detection, key assignment, and data file linking performed by the system 108 provides an improved technical solution to previous error-riddled and inefficient methods of linking documents but also improves processing speeds of matching operations performed by the submission linking system 108 and improves the processing speeds of the processes performed by each of the customer-facing systems 104. Because of the improved accuracy and real-time match detection performed by the system 108, each of the customer-facing system 104 receive more accurate information regarding the status of a respective loan, which enables the systems 104 able to better perform their respective computing functions. For example, the LQA system 208 can more accurately compute the risk of purchases a respective loan if it is not missing any submission files provided by other customer-facing systems 104 at different points the origination and purchase processes of the loan. In some examples, the machine learning-optimized attribute matching performed by the key assignment and matching engine 144 enables these technical benefits provided to the submission linking system 108 and other interfacing customer-facing systems 104.

The submission linking system 108, in some examples, can also include a hindsight application engine 146 that automatically links previously submitted data files to a particular loan based on additional information provided in subsequent submission data files. In some implementations, the submission linking system 108 may have very little or no information regarding a loan's identification attributes early in origination and/or purchase processes of the loan. Therefore, some submission data files for the same loan may be assigned different SLIDs before the system 108 has received additional information from other customer-facing system 104 about the loan. In some implementations, responsive to the key assignment and matching engine 144 identifying a matching loan for the queried submission, the hindsight application engine 146 can use the new matching information to determine whether any of the other previously identified candidate matches with different SLIDs correspond to the same loan. The operations performed by the hindsight application engine 146, in some implementations, allow the system 108 to automatically and continuously improve the overall accuracy of matches as new information is received.

For example, FIG. 7 shows a set identification attributes 700 for submission data files 702, 704, 706 in which the respective submission data files were processed sequentially by the submission linking system 108. In one example, based on the applied matching rules, the key assignment and matching engine 144 did not initially detect a match between submission data files 702 and 704 and assigned different SLIDs 726 (SLID 1 to submission data file 702 and SLID2 to submission data file 704) because neither data file shared the same Appraisal ID 708, LP Key 710, MERS MIN 712, loan ID 714, or party ID 716. The only shared attributes were the address 718, city 720, state 722, and zip code 724 attributes. In one example, upon receiving a query for submission data file 706, the key assignment and matching engine 144 matched the submission data file 706 to submission data file 702 based on the shared appraisal ID 708 in addition to the shared address 718, city 720, state 722, and zip code 724 attributes, resulting in the same SLID value 726 for submission data files 702 and 706. Because of the additional information in submission data file 706 that is associated with SLID1 (e.g., LP Key 710, MERS MIN 712, loan ID 714, and party ID 706), in some examples, the hindsight application engine 146 can reassign the SLID assignment 726 for submission document 704 to be SLID1 due to the correspondence of its LP Key 710, MERS MIN 712, loan ID 714, and party ID 706 with the attributes from submission data file 706.

Figure 8:
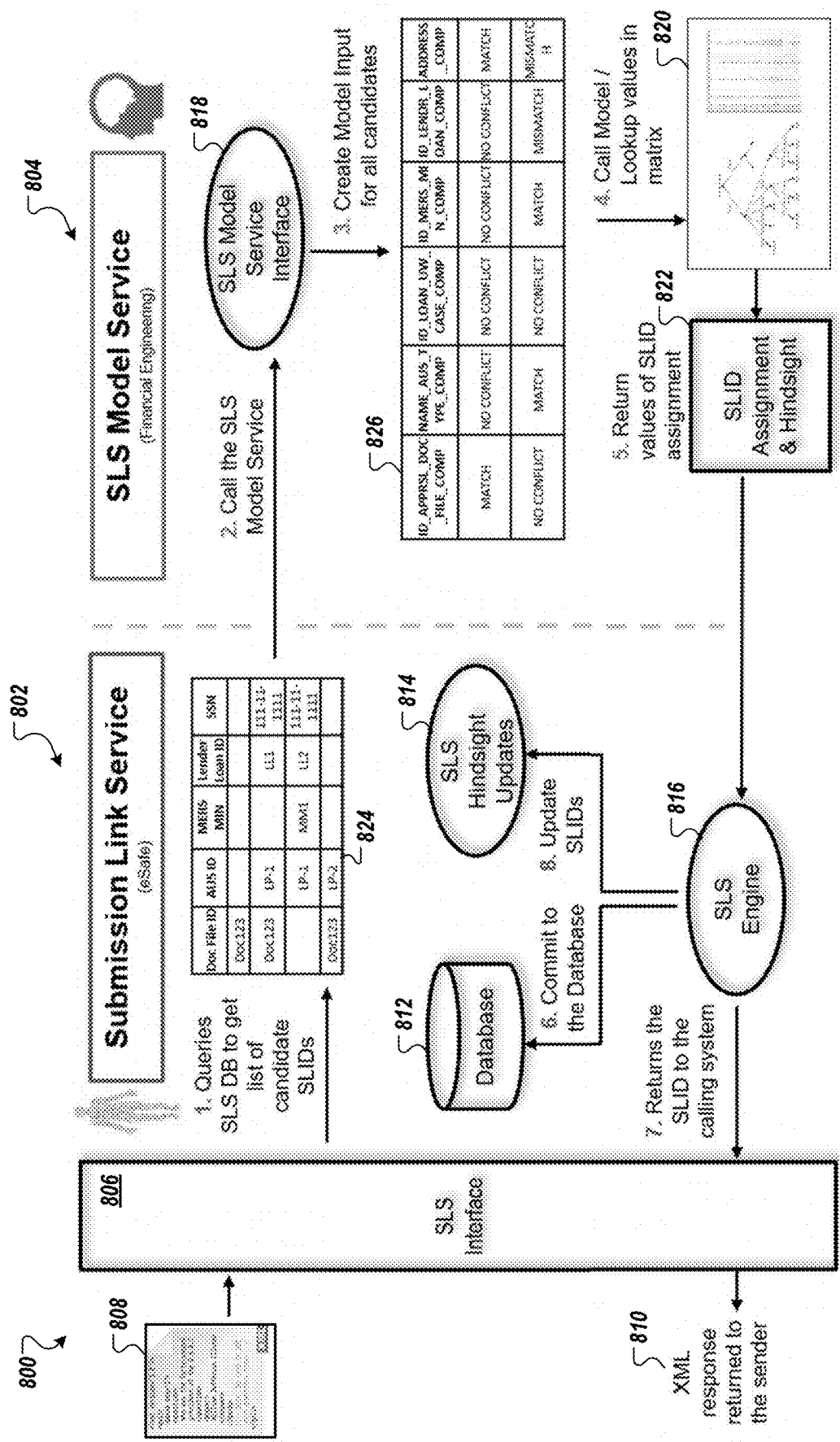
FIG. 8 is a diagram of data flow in a submission linking system.

Turning to FIG. 8, a diagram of data flow in a submission linking system 800 is illustrated, which can represent one implementation of the submission linking system 108 shown in FIG. 1. In some implementations, the system 800 can include a submission linking service (SLS) front end 802 and a SLS model service back end 804. For example, the SLS 802 can include an interface 806 for communicating with one or more customer-facing systems in a loan advisor suite of consumer-facing computing products for managing and processing mortgage submissions (e.g., customer-facing systems 202-210 in loan advisor suite 200 shown in FIG. 2). The SLS front end 802, in some examples, can process received inputs for transfer to the SLS model service 804 for processing and also prepares matching results for storage in data repository 812 as well as transmission to a receiving system.

In one example, the SLS front end 802 receives a query 808 from a customer-facing system via interface 806, which can be in an XML format. The query can include a submission data file and/or a set of loan identification attributes for matching to other data files. In some examples, the customer-facing system submitting the query can correspond to the source system, which may impact which rules are applied. The query can also indicate which of the customer-facing systems is a target or receiving system. In some aspects, the source system and target system for a query may be the same customer-facing system. The interface 806, in some implementations, queries a system database, such as database 812, for a list of candidate SLIDs and their corresponding loan identification attributes 824. In some examples, the candidate SLIDs includes those that share any identification attribute with the identification attributes of the data file submitted with the query 808. The SLS service 802 can transmit the candidate SLIDs to the SLS model service interface 818 of the SLS model service 804 to initiate key matching and assignment processes.

In some examples, the SLS model service 804 prepares model inputs 826 for providing to the trained machine learning models and/or matrix 820 for matching the queried submission attributes to other data files associated with the same loan. In some embodiments, a model input matrix 826 includes entries that compare each identification attribute for the candidate SLIDs to the identification attributes for the loan submission data file associated with the respective query and inserts a result for each comparison. In some examples, the comparison result applied to each input matrix field can correspond to a "match," "mismatch," "no conflict, " or "similar." The trained models and/or matrix 820 apply matching rules to the model input matrix 826 to identify the submission data files that correspond to the same loan. In some examples, the SLS model service 804 assigns SLIDs to the matched data files and performs a hindsight application process 822 to update SLIDs for previously submitted data files that correspond to the same loan (as discussed above for FIG. 7).

The SLS model service 804, in some implementations, returns the SLIDs to a SLS engine 816 of the SLS front end 802, which stores the newly assigned SLIDs to a data repository 812 for the system 800. The SLS system 816 also applies the hindsight updates 814 to previously assigned submissions. Additionally, in some implementations, the SLS engine 816 returns the assigned SLIDs for the respective loan associated with the query to the target system 810 (for example, one of the customer-facing systems 202-210 in the loan advisor suite 200) via the interface 806. The response 810 output by the SLS interface 806 to the target system, in some examples, is in an XML format.

Figure 9:
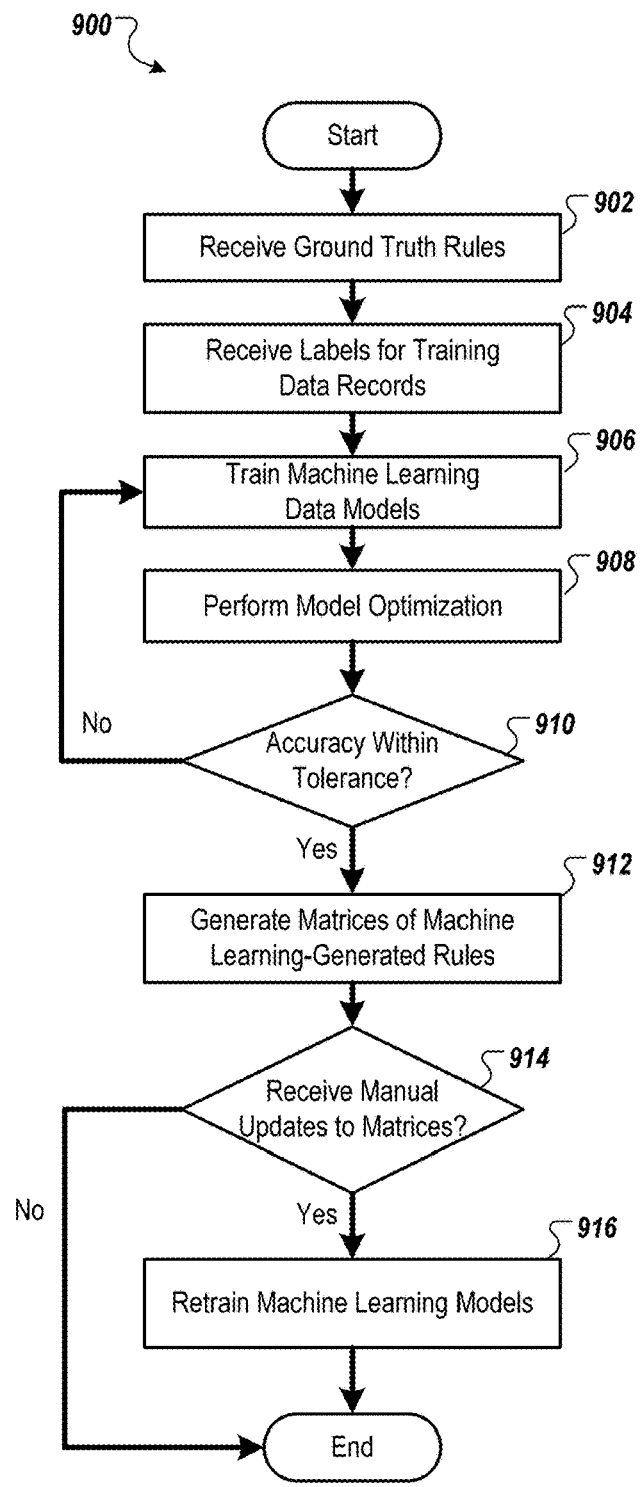
FIG. 9 is a flow chart of an example method of training data models for a submission linking system.

Turning to FIG. 9, a flow chart of an example method 900 for training machine learning data models for a submission linking system 108 is illustrated. In some examples, the system 108 uses trained models and/or predictive matrices to identify documents that are associated with the same loan even when those documents have different identifying characteristics. In some implementations, the method 900 is performed by data management engine 130, AI training engine 142, and/or matching rule management engine 140.

In some implementations, the method 900 begins with AI training engine 142 receiving ground truth rules (902) and labels for training data (904) that are used to train machine learning data models for identifying matches between submission data files that are associated with the same loan (906). In some examples, the ground truth rules can be user-identified rules for matching submission data files that the machine learning data models can use to generate millions of additional matching rules. Additionally, the training data and accompanying labels (904), which can include a few thousand records of identification attributes and their respective labels of whether the respective attribute combination corresponds to a match or a non-match condition (see FIG. 6), can be used to train the machine learning data models for matching loan submission data files (906).

In some embodiments, the AI training engine 142 can perform at least one model optimization round (908). If the matches and predictions of the models and rules are outside a predetermined error tolerance (910), then in some embodiments, the AI training engine 142 can retrain the models. Upon being trained, in some implementations, the machine learning models can produce matrices of matching rules (see matching rules 400, 402 in FIG. 4) in addition to tree models that can be used to detect matches between submission data files (912). In some examples, the AI training engine 142 can generate over 15 million additional matching rules, which improves detection accuracy of the system. The AI training engine 142, in some implementations, generates multiple tree models and averages them together to generate an overall tree model for detecting matches. embodiments, the matrices of matching rules indicating both match and non-match condition criteria reflect the decision criteria in the trained tree models for detecting match conditions between submission data files. In some examples, if users 102 manually update one or more of the machine learning-generated rules provided in the machine rule matrices (914), then the AI training engine 142 can retrain the machine learning models to reflect these updates (916).

Although illustrated in a particular series of events, in other implementations, the steps of the machine learning model training process 900 may be performed simultaneously or in a different order. For example, determining an error tolerance of the trained models (910) may be performed before, after, or simultaneously with generating matrices of machine learning-generated rules (912). Additionally, in other embodiments, the process may include more or fewer steps while remaining within the scope and spirit of the machine learning model training process 900.

Figure 10:
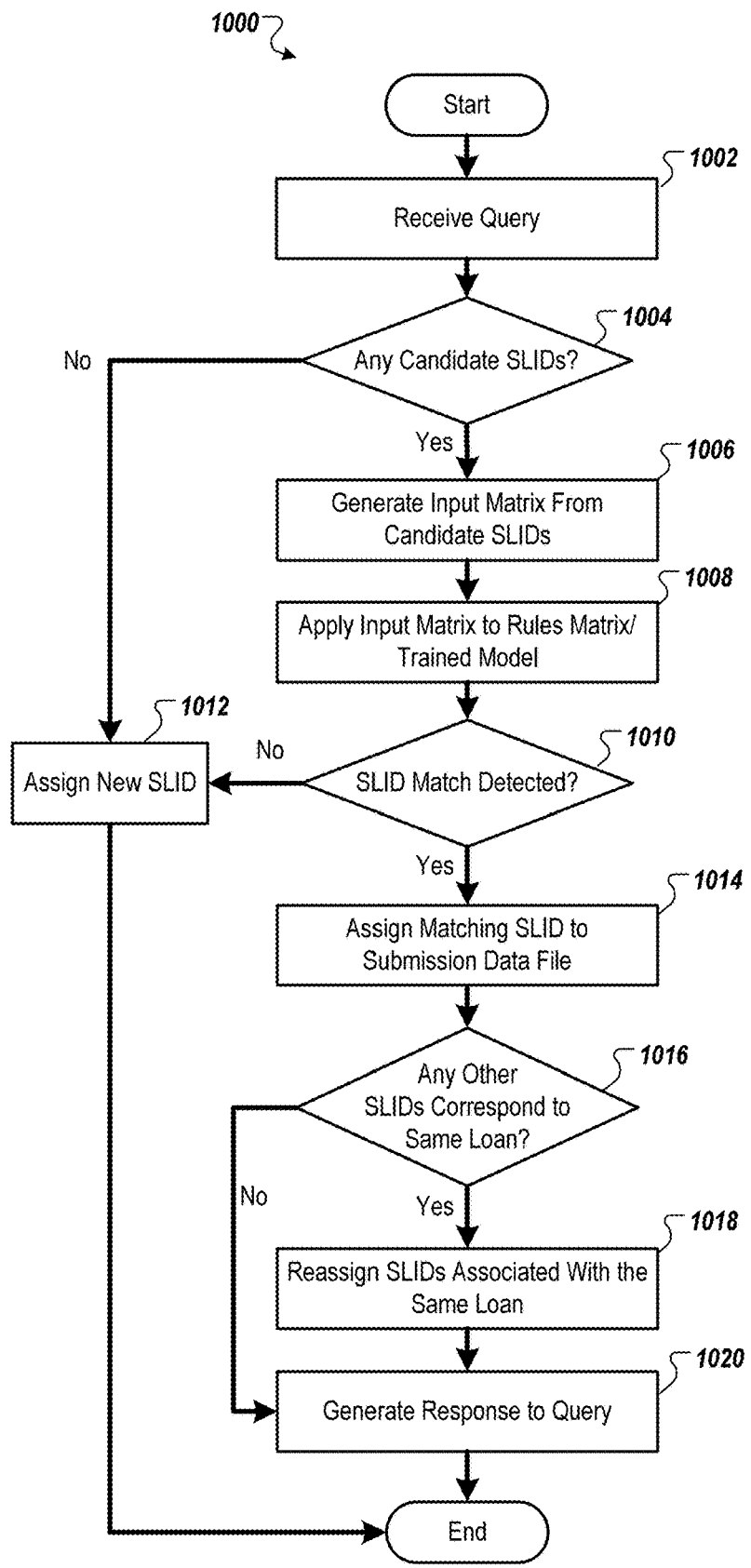
FIG. 10 is a flow chart of an example method for detecting matches between loan submission data files in a submission linking system.

FIG. 10 is a flow chart of an example method 1000 for detecting matches between loan submission data files having different sets of identification attributes. In some examples, the method 1000 processes submission linking queries from one or more customer-facing systems in a loan advisor suite (e.g., loan advisor suite 200 in FIG. 2) to identify other submission data files associated with the same loan by applying identification attributes for the queried data file to a trained machine learning data model. In some examples, the method is performed by data management engine 130, query processing engine 138, attribute extraction engine 136, key assignment and matching engine 144, and/or hindsight application engine 146 of submission linking system (FIG. 1).

In some implementations, the method 1000 begins with query processing engine 138 receiving a query from a customer-facing system 104 and/or user 102 for additional information about a loan associated with a submission data file (1002). In some examples, the query can be associated with an automatically executed software process performed by one of the customer-facing systems 104 that requests additional information associated with a particular loan. The query, in some examples, can include one or more submission data files associated with the respective loan that includes one or more identification attributes that can be used to detect matches with other submission data files that may correspond to the same loan even though they have different identification attributes. In some examples, the query indicates which of the customer-facing systems 104 in the loan advisor suite (e.g., loan advisor suite 200) corresponds to the target system for the query. Additionally, in some examples, the source system for the query corresponds to the customer-facing system 104 submitting the query.

In some examples, key assignment and matching engine 144 can identify all candidate SLIDs (stored as submission linking data 116 in data repository 110) associated with submission identification attributes 114 stored in data repository (1004). In one example, candidate SLIDs can include those SLIDs that have any associated identification attribute that matches any of the identification attributes for the loan and/or submission data file associated with the query. If no candidate SLIDs are identified, then in some examples, the key assignment and matching engine 144 can assign a new SLID to the submission data file associated with the query (1012).

In some implementations, the key assignment and matching engine 144 can generate a model input matrix based on a comparison of the identification attributes in the candidate SLIDs and the identification attributes of the submission data file associated with the query (1006). In some examples, the comparison result applied to each input matrix field can correspond to a "match," "mismatch," "no conflict, " or "similar." In some embodiments, the key assignment and matching engine 144 can apply the model input matrix to the rules matrix and/or trained machine learning data models to detect matches between submission data files that correspond to the same loan (1008). In some examples, the key assignment and matching engine 144 can provide the input matrix as an input to the matrix form of the rules and/or to the trained machine learning tree models to determine whether the identification attributes of the loan submitted with the query correspond to any submission data files previously submitted by one of the customer-facing systems 104. In some implementations, the rules matrix can include ground truth rules, machine learning-generated rules, or both. In some examples, if a match to one or more data files is detected (1010), the key assignment and matching engine 144 assigns a SLID to the submission data file provided with the query that corresponds to the SLID for the matching data files (1014). If no match is detected to any of the submission ID attributes 114 for loan data files 112 provided to the submission linking system 108, in some implementations, the key assignment and matching engine 144 assigns a new SLID to the loan submission data file submitted with the respective query (1012). Applying the input matrix to the trained models, in some embodiments, can also include applying different weighting factors to the identification attributes in the matching process based on a relative importance of each of the identification attributes to the source system and/or the target system in the loan advisor suite 200 (FIG. 2).

In some implementations, based on the matches identified by the key assignment and matching engine 144, hindsight application engine 146 can determine whether any of the other previously identified candidate matches with different SLIDs correspond to the same loan (1016). For example, additional information about the loan provided in the submission data file associated with the query can allow the hindsight application engine 146 to link data files with different SLIDs to the same loan. If any other SLIDs corresponding to the same loan are detected, then in some examples, the hindsight application engine 146 reassigns the SLID to match those other submission data files associated with the same loan (see FIG. 7) (1018). The operations performed by the hindsight application engine 146, in some implementations, allow the system 108 to automatically and continuously improve the overall accuracy of matches as new information is received.

In some implementations, query processing engine 138 can generate and return information for the assigned SLID for the matched loan associated with the query to a target customer-facing system 104 (1020). The response output by the system 108, in some examples, is in an XML format. Additionally, in some embodiments, the response can include the information attributes and/or other information associated with other submission data files for the loan that have been matched to the submission data file associated with the query.

Although illustrated in a particular series of events, in other implementations, the steps of the submission matching and linking process 1000 may be performed simultaneously or in a different order. For example, assigning a new SLID to an unmatched submission data file (1012) may be performed before, after, or simultaneously with reassigning SLIDs associated with the same loan (1018). Additionally, in other embodiments, the process may include more or fewer steps while remaining within the scope and spirit of the submission matching and linking process 1000.

Figure 11:
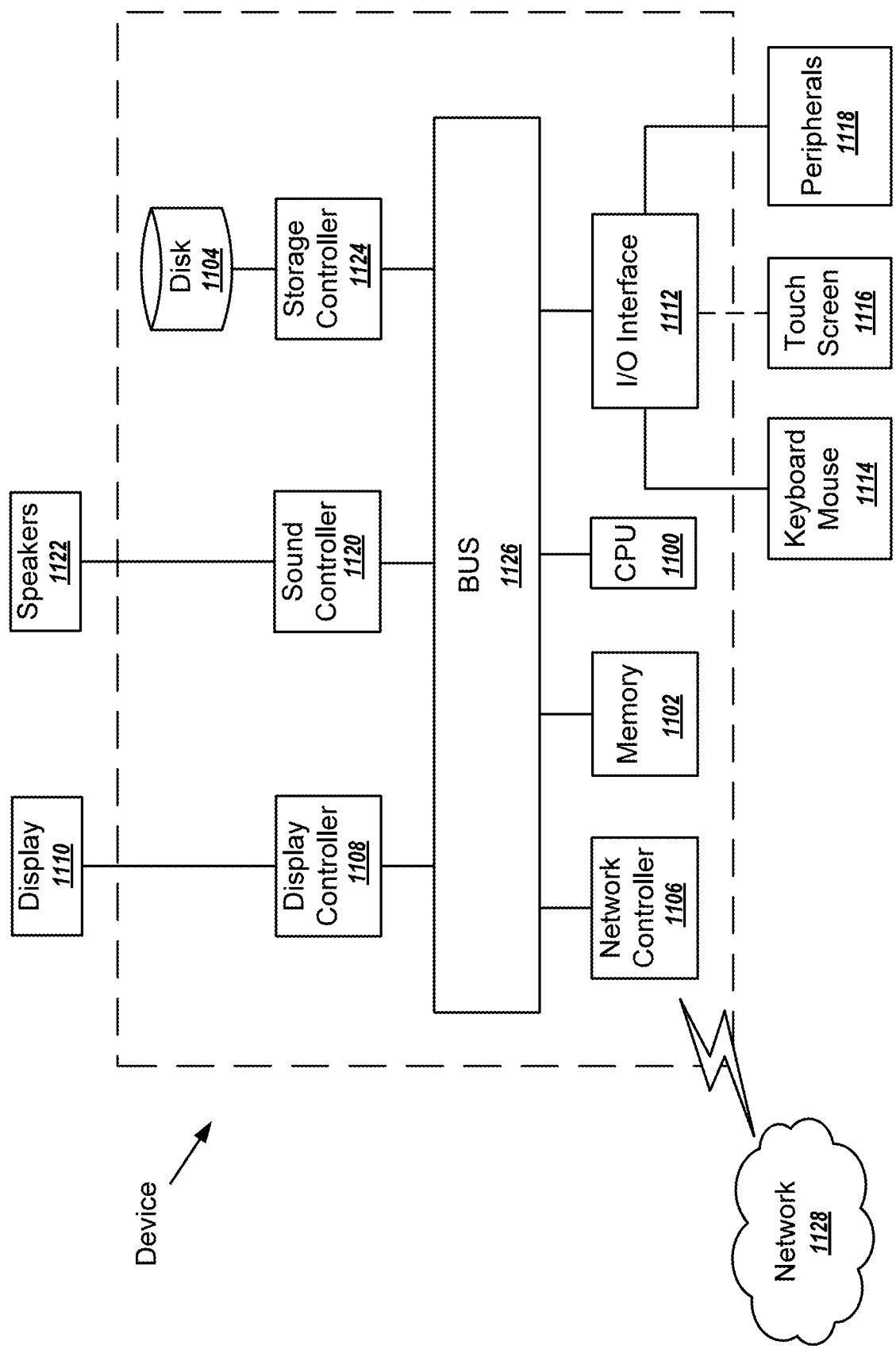
FIG. 11 is a block diagram of an example computing system.

Next, a hardware description of a computing device, mobile computing device, computing system, or server according to exemplary embodiments is described with reference to FIG. 11. The computing device, for example, may represent the users 102, customer-facing systems 104, external data sources 106, or one or more computing systems supporting the functionality of the submission linking system 108, as illustrated in FIG. 1. In FIG. 11, the computing device, mobile computing device, or server includes a CPU 1100 which performs the processes described above. The process data and instructions may be stored in memory 1102. The processing circuitry and stored instructions may enable the computing device to perform, in some examples, the methods 900 and 1000 of FIGS. 9-10. These processes and instructions may also be stored on a storage medium disk 1104 such as a hard drive (HDD) or portable storage medium or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computing device, mobile computing device, or server communicates, such as a server or computer. The storage medium disk 1104, in some examples, may store the contents of the data repository 110 of FIG. 1, as well as the data maintained by the users 102, customer-facing systems 104, and external data sources 106 prior to accessing by the submission linking system 108 and transferring to the data repository 110.

Further, a portion of the claimed advancements may be provided as a utility application, background daemon, or component of an operating system, or combination thereof, executing in conjunction with CPU 1100 and an operating system such as Microsoft Windows 10, UNIX, Solaris, LINUX, Apple MAC-OS and other systems known to those skilled in the art.

CPU 1100 may be a Xeon or Core processor from Intel of America or an Opteron processor from AMD of America, or may be other processor types that would be recognized by one of ordinary skill in the art. Alternatively, the CPU 1100 may be implemented on an FPGA, ASIC, PLD or using discrete logic circuits, as one of ordinary skill in the art would recognize. Further, CPU 1100 may be implemented as multiple processors cooperatively working in parallel to perform the instructions of the inventive processes described above.

The computing device, mobile computing device, or server in FIG. 11 also includes a network controller 1106, such as an Intel Ethernet PRO network interface card from Intel Corporation of America, for interfacing with network 1128. As can be appreciated, the network 1128 can be a public network, such as the Internet, or a private network such as an LAN or WAN network, or any combination thereof and can also include PSTN or ISDN sub-networks. The network 1128 can also be wired, such as an Ethernet network, or can be wireless such as a cellular network including EDGE, 3G, 4G, and 5G wireless cellular systems. The wireless network can also be Wi-Fi, Bluetooth, or any other wireless form of communication that is known. The network 1128, for example, may support communications between the submission linking system 108 and any one of the users 102, customer-facing systems 104, or external data sources 106.

The computing device, mobile computing device, or server further includes a display controller 1108, such as a NVIDIA GeForce GTX or Quadro graphics adaptor from NVIDIA Corporation of America for interfacing with display 1110, such as a Hewlett Packard HPL2445w LCD monitor. A general purpose I/O interface 1112 interfaces with a keyboard and/or mouse 1114 as well as a touch screen panel 1116 on or separate from display 1110. General purpose I/O interface also connects to a variety of peripherals 1118 including printers and scanners, such as an OfficeJet or DeskJet from Hewlett Packard. The display controller 1108 and display 1110 may enable presentation of user interfaces for submitting requests to the submission linking system 108.

A sound controller 1120 is also provided in the computing device, mobile computing device, or server, such as Sound Blaster X-Fi Titanium from Creative, to interface with speakers/microphone 1122 thereby providing sounds and/or music.

The general-purpose storage controller 1124 connects the storage medium disk 1104 with communication bus 1126, which may be an ISA, EISA, VESA, PCI, or similar, for interconnecting all of the components of the computing device, mobile computing device, or server. A description of the general features and functionality of the display 1110, keyboard and/or mouse 1114, as well as the display controller 1108, storage controller 1124, network controller 1106, sound controller 1120, and general purpose I/O interface 1112 is omitted herein for brevity as these features are known.

One or more processors can be utilized to implement various functions and/or algorithms described herein, unless explicitly stated otherwise. Additionally, any functions and/or algorithms described herein, unless explicitly stated otherwise, can be performed upon one or more virtual processors, for example on one or more physical computing systems such as a computer farm or a cloud drive.

Reference has been made to flowchart illustrations and block diagrams of methods, systems and computer program products according to implementations of this disclosure. Aspects thereof are implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Moreover, the present disclosure is not limited to the specific circuit elements described herein, nor is the present disclosure limited to the specific sizing and classification of these elements. For example, the skilled artisan will appreciate that the circuitry described herein may be adapted based on changes on battery sizing and chemistry or based on the requirements of the intended back-up load to be powered.

Figure 12:
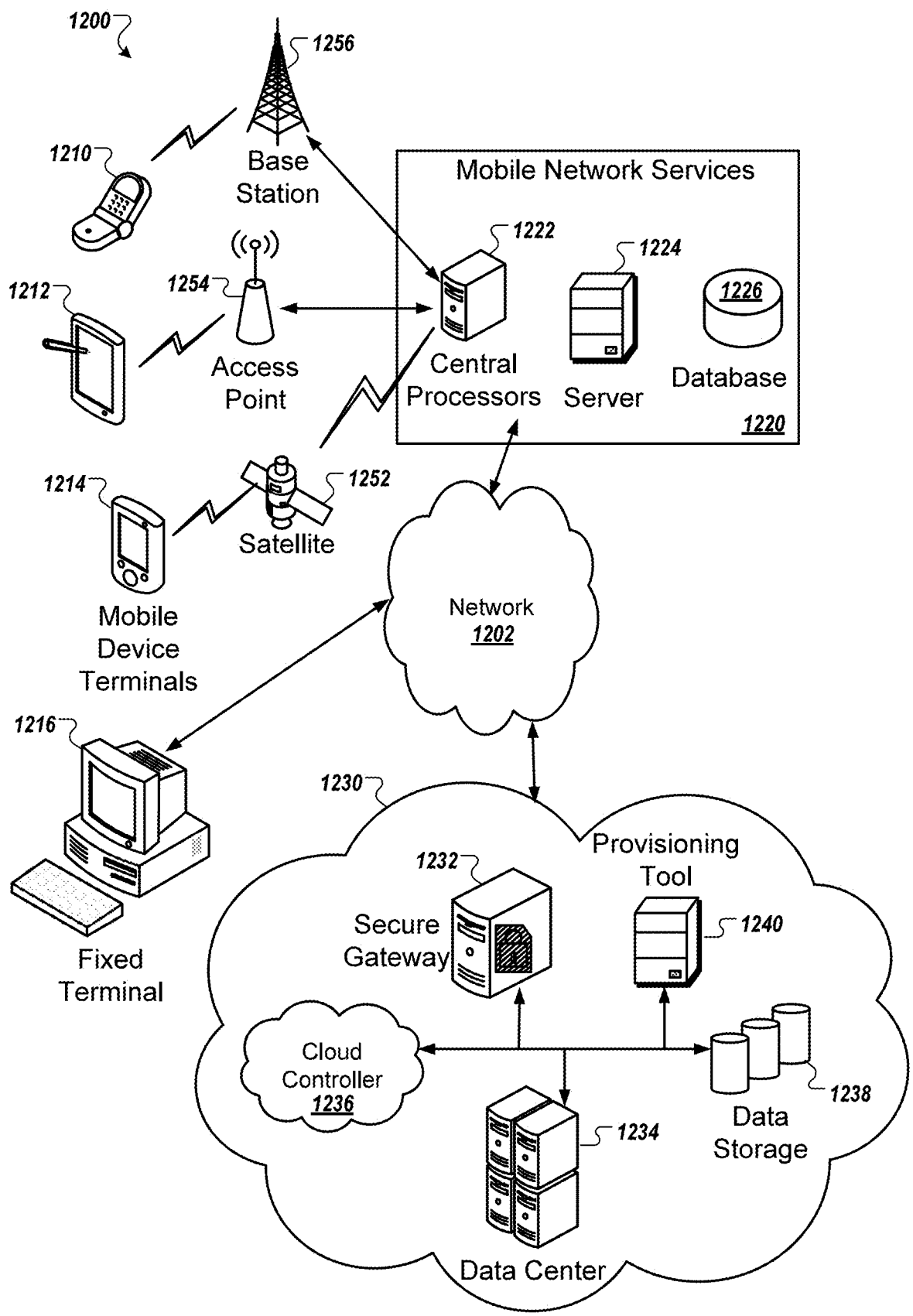
FIG. 12 is a block diagram of an example distributing computing environment including a cloud computing environment.

The functions and features described herein may also be executed by various distributed components of a system. For example, one or more processors may execute these system functions, wherein the processors are distributed across multiple components communicating in a network. The distributed components may include one or more client and server machines, which may share processing, as shown on FIG. 12, in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

In some implementations, the described herein may interface with a cloud computing environment 1230, such as Google Cloud Platform™, Amazon Web Services (AWS™), or Microsoft Azure™ to perform at least portions of methods or algorithms detailed above. The processes associated with the methods described herein can be executed on a computation processor, such as the Google Compute Engine by data center 1234. The data center 1234, for example, can also include an application processor, such as the Google App Engine, that can be used as the interface with the systems described herein to receive data and output corresponding information. The cloud computing environment 1230 may also include one or more databases 1238 or other data storage, such as cloud storage and a query database. In some implementations, the cloud storage database 1238, such as the Google Cloud Storage, may store processed and unprocessed data supplied by systems described herein. For example, query data 111, loan data files 112, submission identification attributes 114, submission linking data 116, matching rules 118, training data 120, and/or trained data models 122 may be maintained by the submission linking system 108 of FIG. 1 in a database structure such as the databases 1238.

The systems described herein may communicate with the cloud computing environment 1230 through a secure gateway 1232. In some implementations, the secure gateway 1232 includes a database querying interface, such as the Google BigQuery platform. The data querying interface, for example, may support access by the submission linking system 108 to data stored on any one of the users 102 and customer-facing systems 104.

The cloud computing environment 1230 may include a provisioning tool 1240 for resource management. The provisioning tool 1240 may be connected to the computing devices of a data center 1234 to facilitate the provision of computing resources of the data center 1234. The provisioning tool 1240 may receive a request for a computing resource via the secure gateway 1232 or a cloud controller 1236. The provisioning tool 1240 may facilitate a connection to a particular computing device of the data center 1234.

A network 1202 represents one or more networks, such as the Internet, connecting the cloud environment 1230 to a number of client devices such as, in some examples, a cellular telephone 1210, a tablet computer 1212, a mobile computing device 1214, and a desktop computing device 1216. The network 1202 can also communicate via wireless networks using a variety of mobile network services 1220 such as Wi-Fi, Bluetooth, cellular networks including EDGE, 3G, 4G, and 5G wireless cellular systems, or any other wireless form of communication that is known. In some examples, the wireless network services 1220 may include central processors 1222, servers 1224, and databases 1226. In some embodiments, the network 1202 is agnostic to local interfaces and networks associated with the client devices to allow for integration of the local interfaces and networks configured to perform the processes described herein. Additionally, external devices such as the cellular telephone 1210, tablet computer 1212, and mobile computing device 1214 may communicate with the mobile network services 1220 via a base station 1256, access point 1254, and/or satellite 1252.

While certain embodiments have been described, these embodiments have been presented by way of example only and are not intended to limit the scope of the present disclosures. Indeed, the novel methods, apparatuses and systems described herein can be embodied in a variety of other forms; furthermore, various omissions, substitutions and changes in the form of the methods, apparatuses and systems described herein can be made without departing from the spirit of the present disclosures. The accompanying claims and their equivalents are intended to cover such forms or modifications as would fall within the scope and spirit of the present disclosures.

What is claimed is:
1. A system comprising:
   processing circuitry;
   a non-transitory database storage region storing a plurality of data files associated with a plurality of products; and a non-transitory computer readable memory coupled to the processing circuitry, the non-transitory computer readable memory storing machine-executable instructions, wherein the machine-executable instructions, when executed on the processing circuitry, cause the processing circuitry to receive, from a requesting remote computing system of a plurality of remote computing systems via a network, a request to link a first data file associated with a product of the plurality of products to one or more second data files associated with the product, generate, from one or more first identification attributes of a plurality of identification attributes associated with the first data file, a matching input matrix comparing each of the one or more first identification attributes for the first data file to second identification attributes of the plurality of identification attributes for one or more candidate data files of the plurality of data files, each of the one or more candidate data files sharing at least one of the plurality of identification attributes in common with the first data file, wherein generating the matching input matrix includes applying a comparison result to each entry of the matching input matrix indicating a result of each comparison of the one or more first identification attributes for the first data file to the second identification attributes for the one or more candidate data files, identify, from the one or more candidate data files, the one or more second data files associated with the product based on application of a plurality of attribute matching rules to the matching input matrix, wherein a portion of the one or more first identification attributes for the first data file is different from the second identification attributes for each of the one or more second data files, link, within the non-transitory database storage region, the first data file to the one or more second data files by applying a first product linking key to the first data file corresponding to the first product linking key for the one or more second data files, and output, to a receiving remote computing system of the plurality of remote computing systems, at least one of the first product linking key or other data for the product associated with the request.

2. The system of claim 1, wherein the product is a loan product.

3. The system of claim 1, wherein the plurality of identification attributes include at least one of an appraisal identification (ID), an automated underwriting system (AUS) key, a MERS MIN identifier, a product ID, a party ID, or address information for the product.

4. The system of claim 1, wherein the receiving remote computing system is a different computing system from the requesting remote computing system.

5. The system of claim 1, wherein the request indicates which of the plurality of remote computing systems is the receiving remote computing system.

6. The system of claim 1, wherein each of the plurality of remote computing systems is associated with a different aspect of managing the product throughout one or more phases of the product, and wherein each of the plurality of data files is associated with one or more of the plurality of remote computing systems.

7. The system of claim 6, wherein the plurality of remote computing systems include at least one of a loan underwriting system, an appraisal risk evaluation system, a loan closing management system, a loan risk assessment system, and a loan selling system.

8. The system of claim 6, wherein one or more of the plurality of identification attributes are primarily associated with a type of data file of the plurality of data files provided to the system by a respective remote computing system of the plurality of remote computing systems.

9. The system of claim 8, wherein identifying the one or more second data files based on the application of the plurality of attribute matching rules to the matching input matrix includes applying weighting factors to each of the plurality of identification attributes based on a relative importance to the requesting remote computing system or the receiving remote computing system.

10. The system of claim 1, wherein the comparison result for each entry of the matching input matrix comprises at least one of a match result, a mismatch result, a no conflict result, or a similar result.

11. The system of claim 1, wherein the machine-executable instructions, when executed on the processing circuitry, further cause the processing circuitry to:

generate, from a machine learning data model, a portion of the plurality of attribute matching rules, wherein the machine learning data model is trained with a set of ground truth matching rules and a set of labeled identification attribute records.

12. The system of claim 11, wherein the machine learning data model is a gradient boosted tree model.

13. The system of claim 12, wherein the machine learning data model is an average of a plurality of trained gradient boosted tree models.

14. The system of claim 11, wherein identifying the one or more second data files associated with the product comprises applying the matching input matrix to the machine learning data model.

15. The system of claim 11, wherein the machine-executable instructions, when executed on the processing circuitry, further cause the processing circuitry to:

output, to a user interface at one of the plurality of remote computing systems, the portion of the plurality of attribute matching rules for review; and update, based on feedback received via the user interface at the one of the plurality of remote computing systems, one or more rules of the portion of the plurality of attribute matching rules.

16. The system of claim 15, wherein the machine-executable instructions, when executed on the processing circuitry, further cause the processing circuitry to:

retrain, responsive to receiving the one or more updated rules, the trained machine learning data model to incorporate the one or more updated rules.

17. The system of claim 1, wherein the machine-executable instructions, when executed on the processing circuitry, further cause the processing circuitry to:

responsive to identifying the one or more second data files from the one or more candidate data files, identify one or more unmatched candidate data files that are associated with the product based on information in the one or more first identification attributes; and reassign respective second product linking keys for the one or more unmatched candidate data files to the first product linking key.

18. A method comprising:

receiving, by processing circuitry from a source remote computing system of a plurality of remote computing systems via a network, a query to link a first data submission associated with a product of a plurality of products to one or more second data submissions associated with the product;

generating, by the processing circuitry from one or more first identification attributes of a plurality of identification attributes associated with the first data submission, a matching input matrix comparing each of the one or more first identification attributes for the first data submission to second identification attributes of the plurality of identification attributes for one or more candidate data submissions of a plurality of data submissions, each of the one or more candidate data submissions sharing at least one of the plurality of identification attributes in common with the first data submission, wherein
generating the matching input matrix includes applying a comparison result to each entry of the matching input matrix indicating a result of each comparison of the one or more first identification attributes for the first data file to the second identification attributes for the one or more candidate data files;

identifying, by the processing circuitry from the one or more candidate data submissions, the one or more second data submissions associated with the product based on application of a plurality of attribute matching rules to the matching input matrix, wherein a portion of the plurality of attribute matching rules are generated by a machine learning model trained with a set of ground truth matching rules and a set of labeled identification attribute records, and wherein a portion of the one or more first identification attributes for the first data submission is different from the second identification attributes for each of the one or more second data submissions;

linking, by the processing circuitry within a non-transitory database storage region, the first data submission to the one or more second data submissions by applying a first linking key to the first data submission corresponding to the first linking key for the one or more second data submissions; and outputting, by the processing circuitry to a target remote computing system of the plurality of remote computing systems, at least one of the first linking key or other data for the product associated with the query.

19. A non-transitory computer readable medium having instructions stored thereon, wherein the instructions, when executed by processing circuitry, cause the processing circuitry to:

receive, from a source remote computing system of a plurality of remote computing systems via a network, a query to link a first data submission associated with a product of a plurality of products to one or more second data submissions associated with the product;

generate, from one or more first identification attributes of a plurality of identification attributes associated with the first data submission, a matching input matrix comparing each of the one or more first identification attributes for the first data submission to second identification attributes of the plurality of identification attributes for one or more candidate data submissions of a plurality of data submissions, wherein each of the one or more candidate data submissions shares at least one of the plurality of identification attributes in common with the first data submission, and generating the matching input matrix includes applying a comparison result to each entry of the matching input matrix indicating a result of each comparison of the one or more first identification attributes for the first data file to the second identification attributes for the one or more candidate data files;

generate, by a machine learning model trained with a set of ground truth matching rules and a set of labeled identification attribute records, a plurality of attribute matching rules;

identify, from the one or more candidate data submissions, the one or more second data submissions associated with the product based on application of the plurality of attribute matching rules to the matching input matrix, wherein a portion of the one or more first identification attributes for the first data submission is different from the second identification attributes for each of the one or more second data submissions;

link, within a non-transitory database storage region, the first data submission to the one or more second data submissions by applying a first linking key to the first data submission corresponding to the first linking key for the one or more second data submissions; and output, to a target remote computing system of the plurality of remote computing systems, at least one of the first linking key or other data for the product associated with the query.

* * * * *